May 19, 1936.  R. G. ALLEN  2,041,671
GLASSWARE FORMING MACHINE
Filed June 21, 1934   7 Sheets-Sheet 1

Russell G. Allen
INVENTOR.

BY J. F. Rule
ATTORNEY

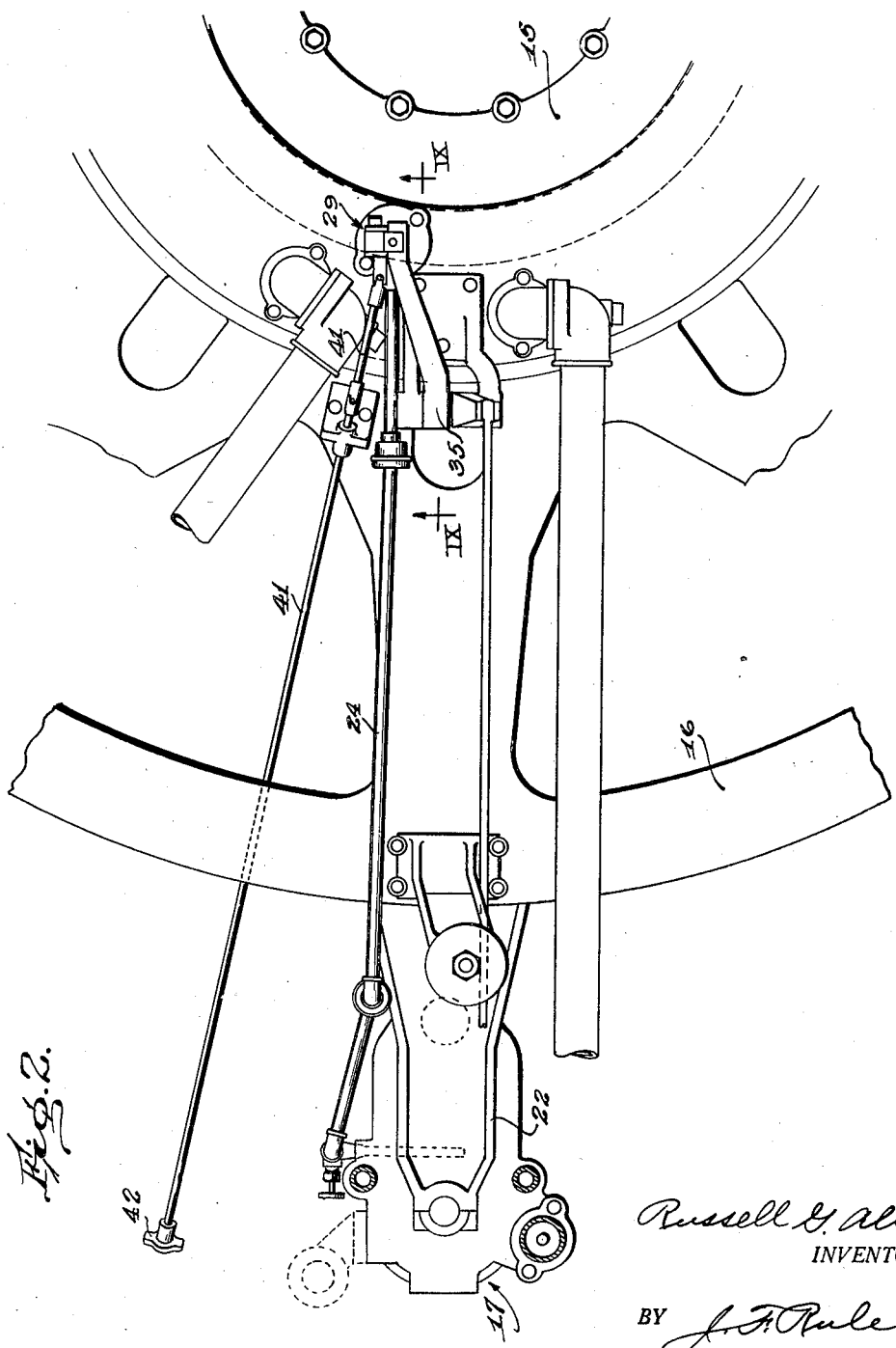

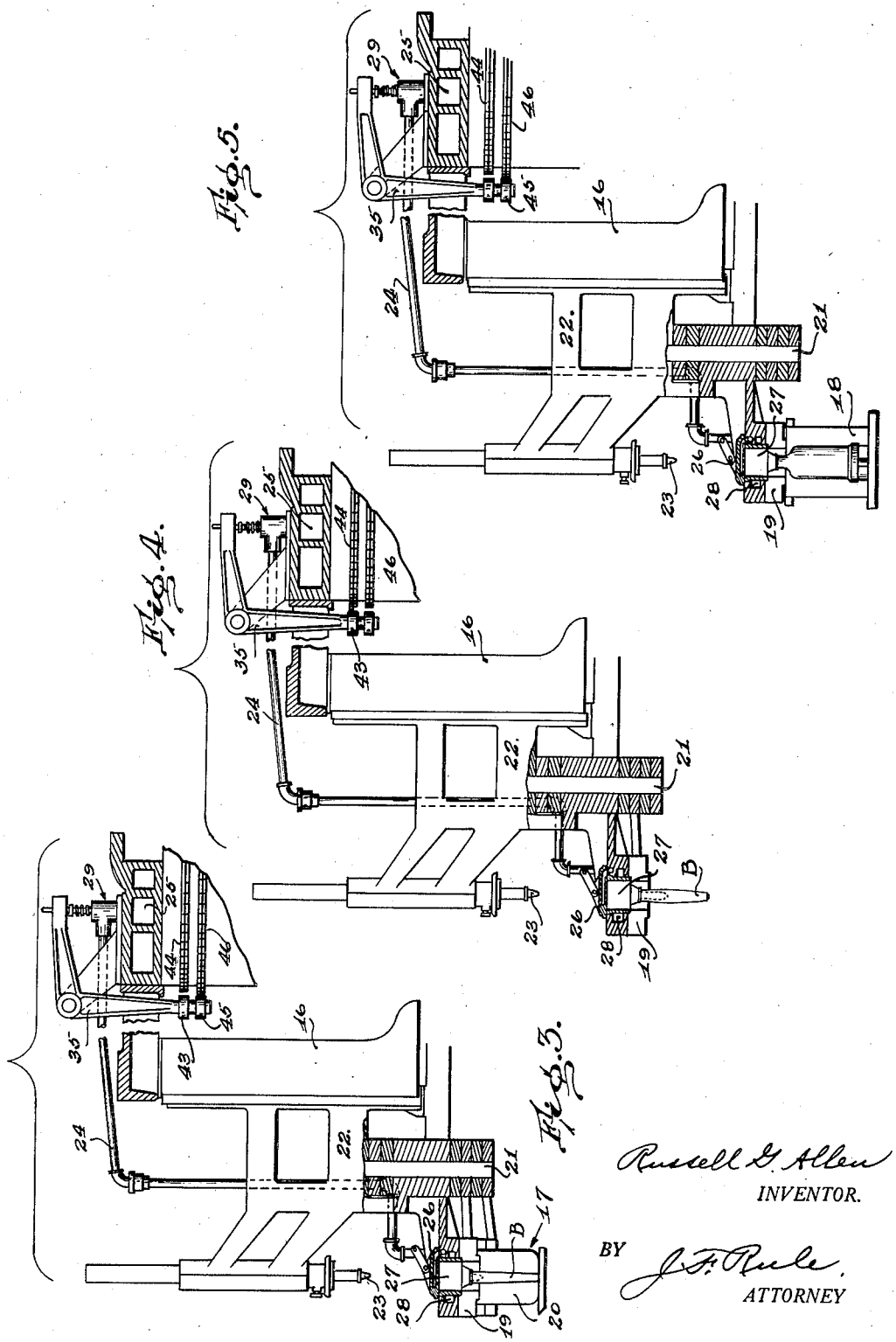

May 19, 1936.   R. G. ALLEN   2,041,671
GLASSWARE FORMING MACHINE
Filed June 21, 1934   7 Sheets-Sheet 4
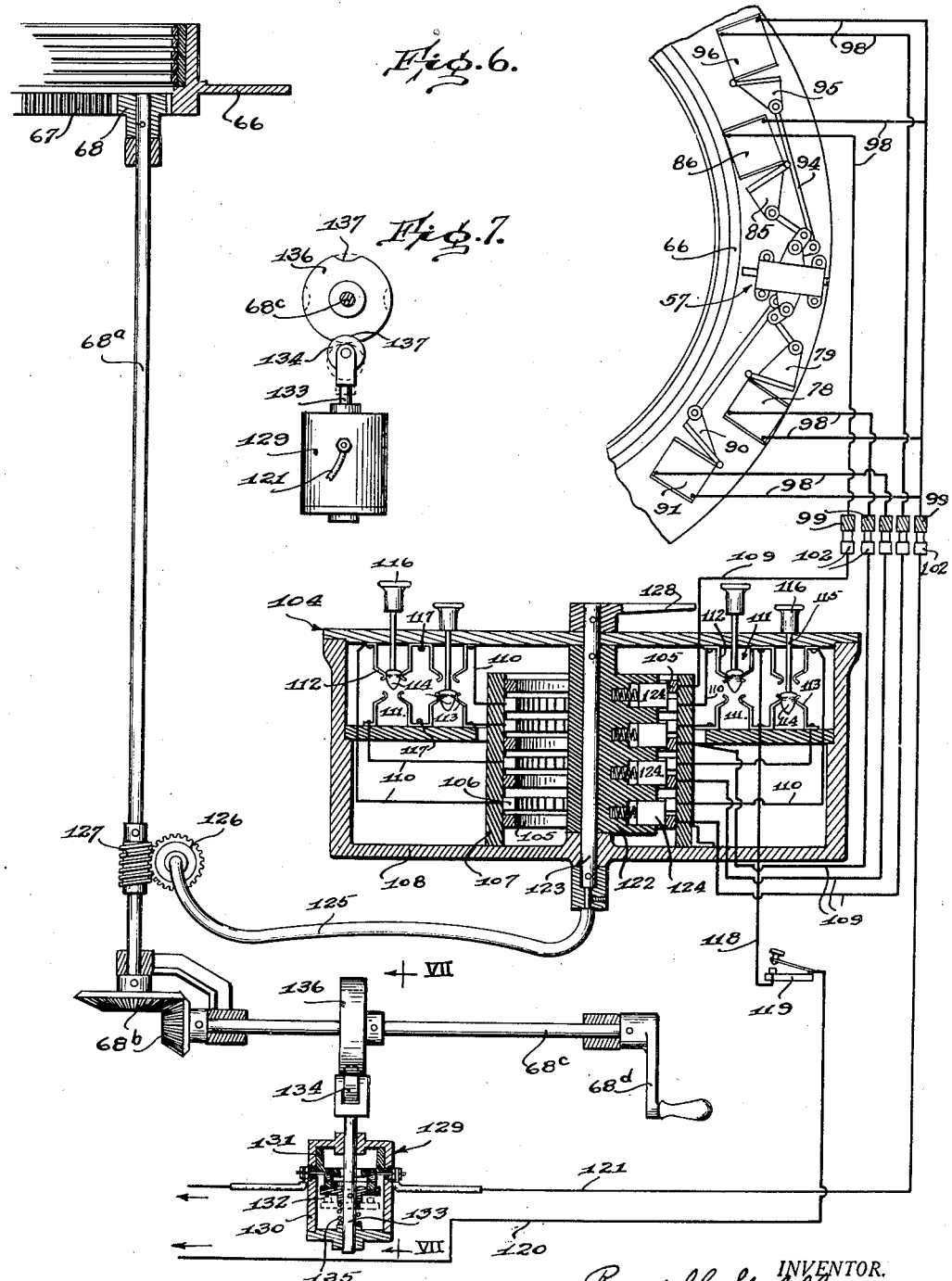
INVENTOR.
Russell G. Allen
BY
J. F. Rule, ATTORNEY

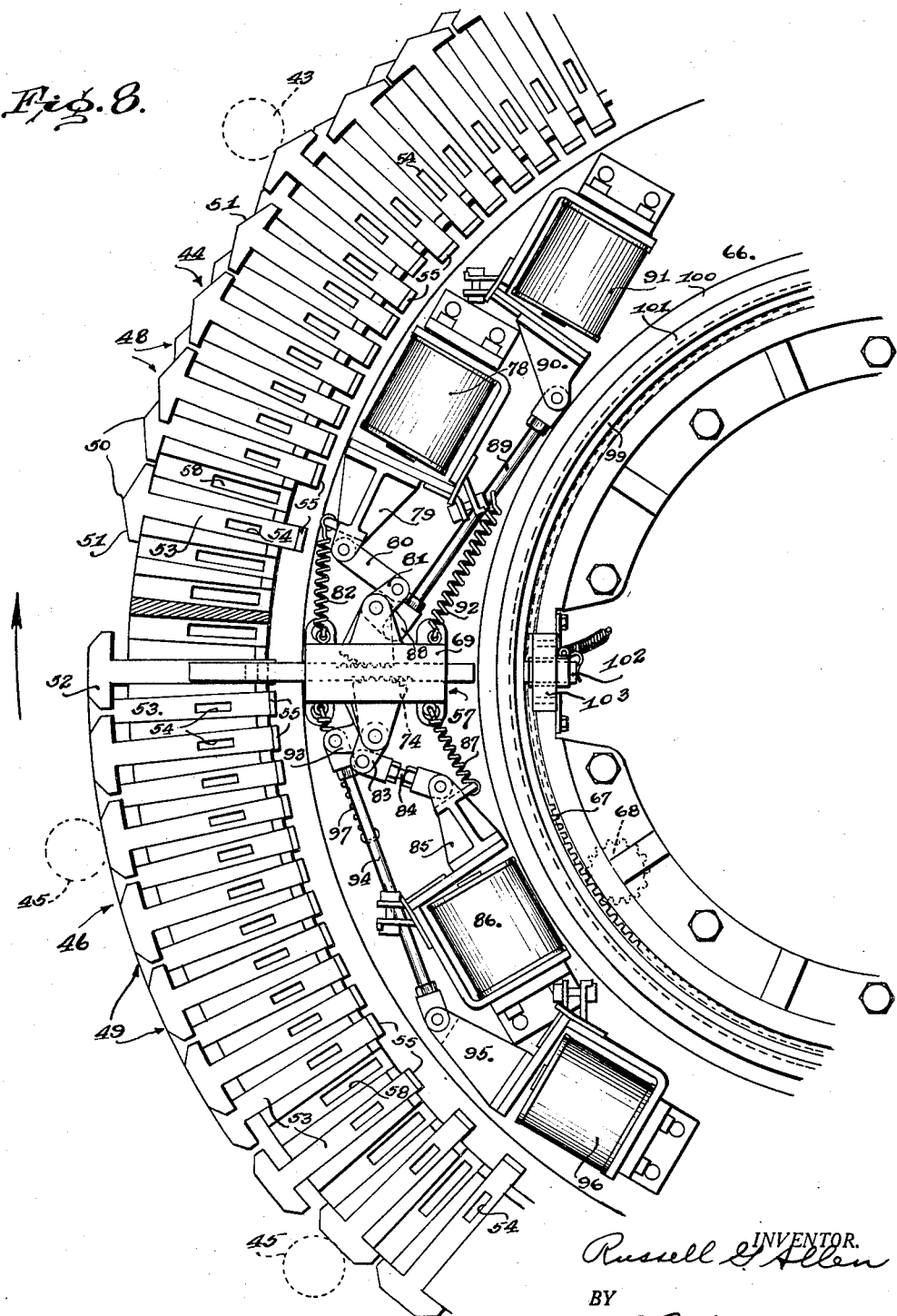

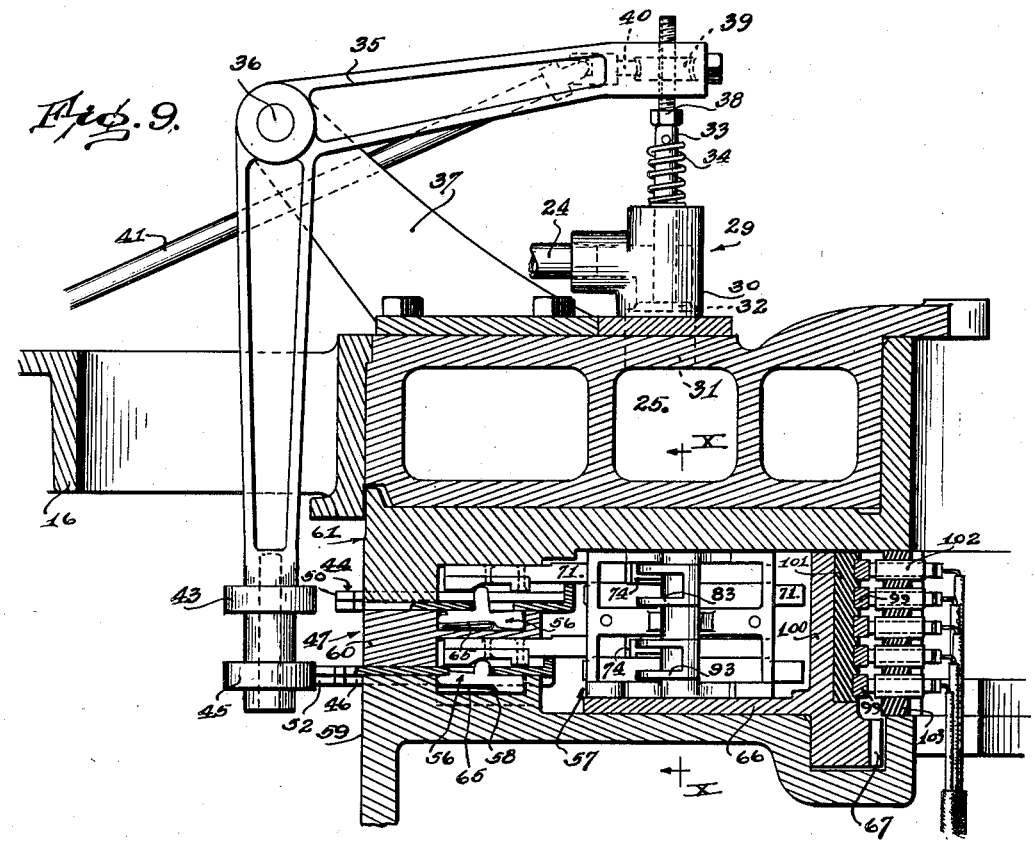
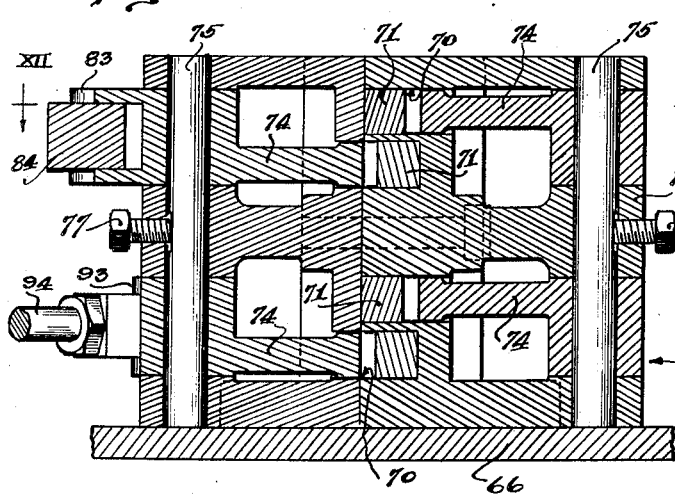
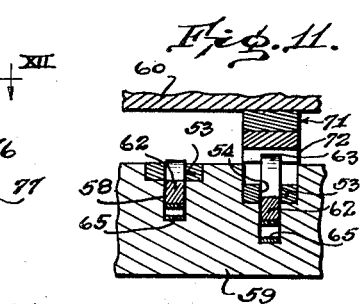

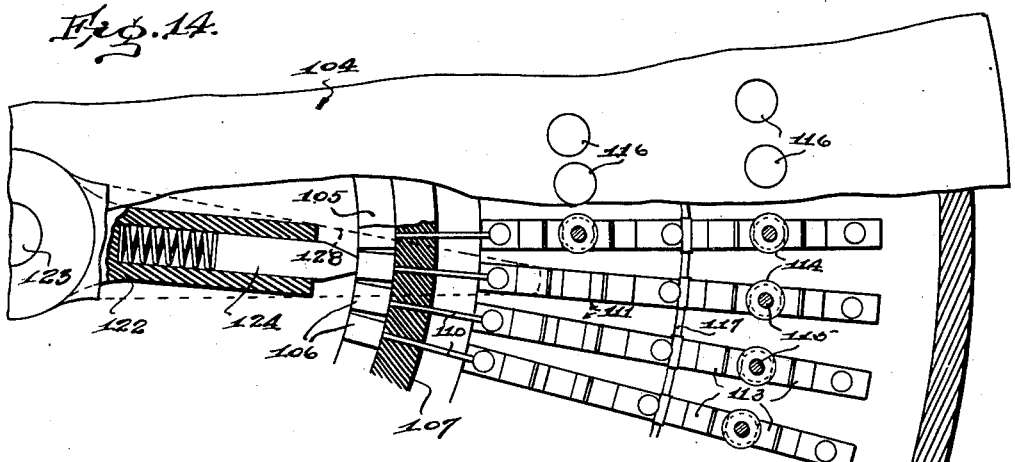
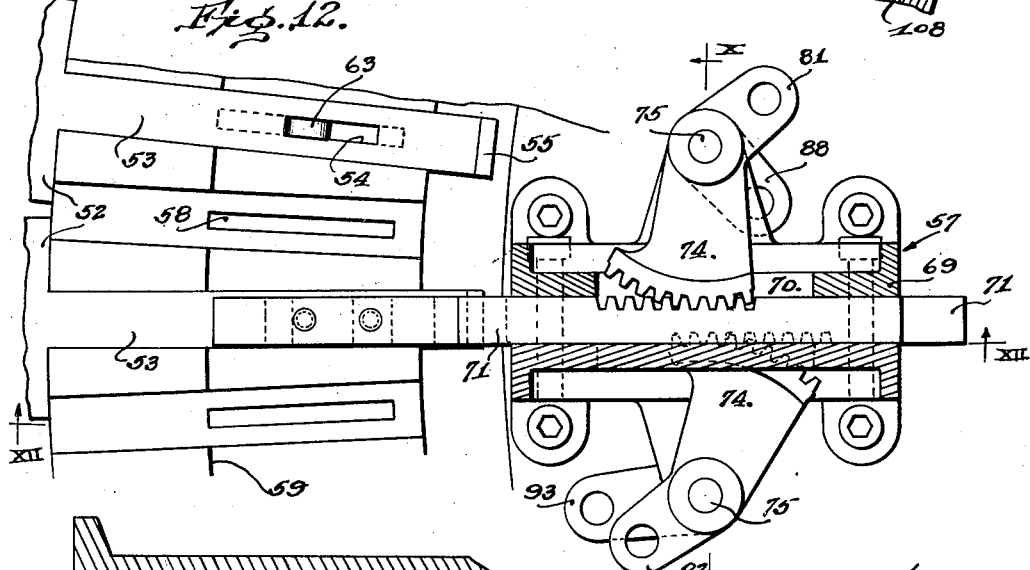
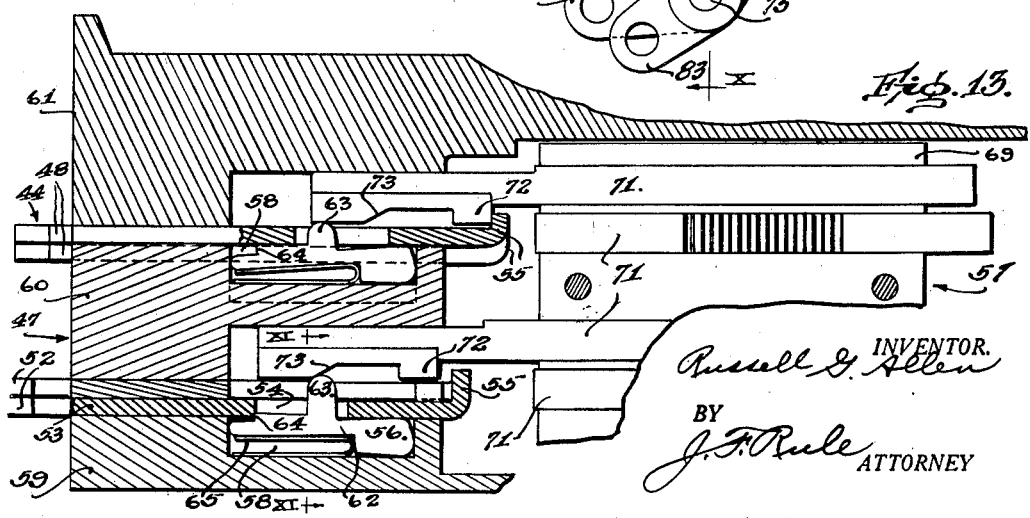

Patented May 19, 1936

2,041,671

UNITED STATES PATENT OFFICE 2,041,671

GLASSWARE FORMING MACHINE

Russell G. Allen, Alton, Ill., assignor to Owens-Illinois Glass Company, a corporation of Ohio Application June 21, 1934, Serial No. 731,670

31 Claims. (Cl. 49—5)

The present invention relates to improvements in glassware forming machines and more particularly to the cam mechanisms for controlling air valves on an automatic machine, it being understood, however, that various features of the invention may be employed to advantage in other combinations and for different purposes.

In certain types of automatic machines for making bottles, jars, and other like glass articles the cycle of operations involves delivery of a mold charge of molten glass to a blank mold; the application of air under pressure to one end of the mold for the purpose of forcing the glass into intimate contact with the walls of the cavity and thereby extracting heat from the glass; opening the blank mold and applying a short puff of compressed air to the interior of the mold charge (which has now assumed the form of a blank or parison); transferring the blank or parison to a finishing mold and applying additional air under pressure for the purpose of expanding said blank or parison to the shape of the finishing mold cavity. These molds are ordinarily mounted upon a continuously rotating mold carriage and the operations just described take place during rotation of the carriage. Valves for controlling the supply of air under pressure to the molds are ordinarily actuated by stationary cams cooperating with valve operating devices on the rotating mold carriage. Frequently it is desirable and in fact necessary to vary the point at which, during the travel of the mold, an air valve is opened by the stationary cam for the commencement of the blowing operations. It may be desirable to change the length of time during which such blowing operation is continued. Moreover, varying conditions such as changes in the temperature of the glass, molds, etc., often make it desirable to change the point at which these various valves are opened and/or closed.

An object of the present invention is the provision of novel apparatus whereby the position and length of the cams for actuating the valve operating devices may be varied without interrupting the continuous operation of the machine.

Another object of the present invention is the provision of a cam adjusting device common to all of a group of adjustable cams and operable without interrupting continuous operation of the machine to select and adjust the desired cams.

A further object is the provision of a combined mechanical and electrical device for adjusting any of a group of cams, said device being common to all of the cams and radially shiftable into cooperative relation to the cams which are to be adjusted.

Other objects will be in part apparent and in part pointed out hereinafter.

In the accompanying drawings:

Fig. 2 is a top plan view thereof.

Figure 1:
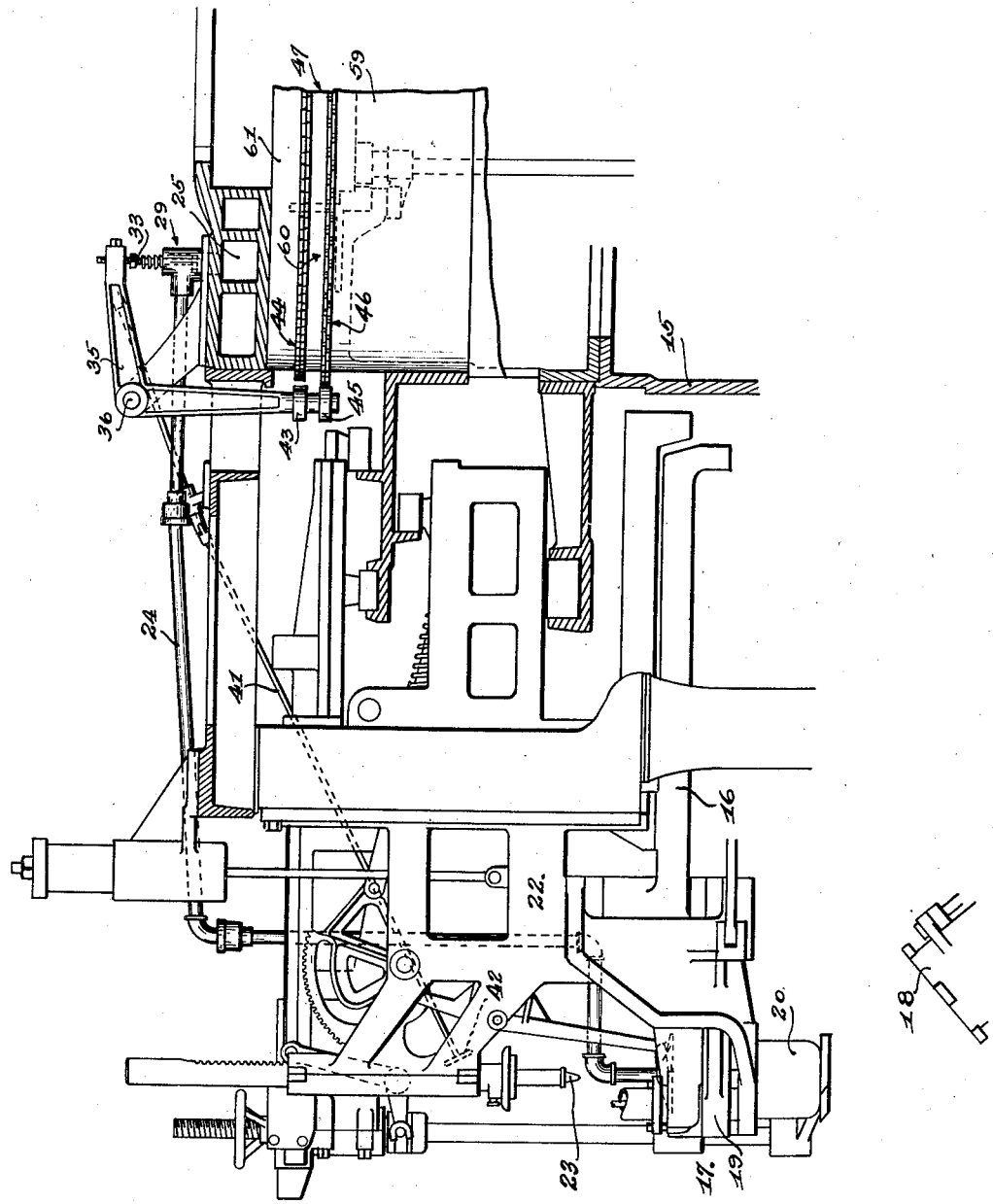
Fig. 1 is a fragmentary sectional elevational view illustrating the embodiment of the present invention in a machine of the well known Owens type.

Figs. 3, 4, and 5, illustrate the three successive blowing operations involved. Fig. 3 is a fragmentary sectional elevational view illustrating the compression operation in which air under pressure forces the molten glass into intimate contact with the walls of the mold cavity. Fig. 4 is a fragmentary sectional elevational view showing the puff operation in which air under pressure is applied to form an initial blow opening in the upper end of the blank. Fig. 5 is a fragmentary sectional elevational view showing the final blowing operation in which the blank is expanded in the finishing mold.

Fig. 6 is a part sectional diagrammatic view illustrating the complete apparatus including electric circuits and control devices.

Fig. 7 is a sectional elevational view taken substantially along the line VII—VII of Fig. 6.

Fig. 8 is a fragmentary plan view with parts in section showing the cam segments and mechanism for adjusting them.

Fig. 9 is a detail vertical sectional view with parts in elevation taken substantially along the line IX—IX of Fig. 2.

Fig. 10 is a vertical sectional view taken along the line X—X of Figs. 9 and 12.

Fig. 11 is a detail sectional view taken substantially along the line XI—XI of Fig. 13.

Fig. 12 is a sectional plan view taken along the line XII—XII of Fig. 10.

Fig. 13 is a vertical sectional elevation view taken substantially along the line XIII—XIII of Fig. 12.

Fig. 14 is a fragmentary top plan view with parts in section of the control switch box.

The present invention is illustrated in connection with a bottle forming machine of the well known Owens type such as shown in La France Patent 1,185,687, June 6, 1916, to which reference may be made for details of construction and operation. In Fig. 1 the machine is shown as consisting of a stationary central column 15 supporting a rotary mold carriage 16 upon the upper portion of which is mounted a conventional blank mold unit 17 and in a plane below it a finishing mold 18. The blank mold unit consists of a partible neck mold 19 and partible body blank mold 20, which are mounted upon a hinge pin 21, said hinge pin in turn being carried by a dipping frame 22 in the customary manner. A plunger 23 is mounted on said dipping frame for projection into the neck mold 19. Means for supplying air under pressure to the neck mold 19 for application to a blank or parison "B" consists of a supply pipe 24 connecting an air pressure chamber 25 and a blow slide 26 which is moved into and out of position over a chamber 27 in a head casting 28 by means of the usual or any preferred mechanism. A valve 29 is mounted upon the upper end of the mold carriage and includes a housing 30 in the form of a T-coupling communicating with the interior of said chamber 25 through an opening 31 and suitably connected to said supply pipe 24. A valve disk 32 and stem 33 attached thereto are mounted in said housing, a coil spring 34 encircling the stem externally of the housing and yieldingly holding said disk in its closed position.

Valve actuating devices which are individual to the valves 29 and heads or mold groups of the machine are mounted upon the upper end of the rotary mold carriage, each device consisting of a bell crank lever 35 pivoted to a horizontal hinge pin 36 on a bracket 37, one arm of the lever carrying an adjustable screw 38 designed for engagement with the upper end of the valve stem 33. Adjustment of this screw 38 to thereby regulably predetermine the point at which it is brought into engagement with the valve stem and consequently the extent of opening of the valve 29 is obtained by a construction including a worm gear 39 which is threaded on said screw and a worm 40 meshing with said worm gear 39 and suitably connected by means of shafts 41 to a hand lever 42. This screw is splined to the arm with the result that it moves axially when the worm gear is rotated. The other arm of the bell crank lever 35 carries a pair of vertically spaced cam rollers, the upper roller 43 being positioned for engagement with a puff cam 44 and the lower roller 45 being positioned for engagement with a cam 46 which times the blank compression and final blowing operations.

These cams 44 and 46 which consist of separate independently adjustable segments arranged side by side in circumferentially spaced relation are mounted in a slotted holder 47 at the upper end of the stationary column 15. The puff control cam 44 is arranged in the upper part of the holder (Fig. 9) for engagement with the roller 43 and the cam 46 for controlling the blank compression and final blowing operations is disposed just below the puff cam, in said holder. The segments 48 making up the puff cam 44 and the segments 49 constituting the other cam 46 are substantially T-shape. The head 50 on each puff cam segment is formed with oppositely inclined surfaces 51 providing a more or less pointed outer end for engagement with the cam roller 43. Such formation provides for a gradual opening and closing of the valve and only a comparatively short period of complete opening, if such be desired. The heads 52 on the segments 49 have their outer surfaces concentric with the axis of the mold carriage. In the latter instance the cam segments are arranged in two sets so that the heads overlap and as in the cam 46 provide in effect an unbroken continuous surface for engagement with the cam roller 45. Arms 53 extending radially inward from the heads 50 and 52 of the segments 48 and 49 respectively, are formed with vertical longitudinal slots 54 near their inner ends and with upstanding fingers 55 at their extreme inner ends, said slots being adapted to engage with latches 56 and the fingers adapted to be engaged by a shifting or adjusting device 57 as will be apparent presently.

These latches 56 are positioned in recesses 58 in the top surface of the lower and intermediate rings 59 and 60 respectively, which together with a top ring 61 form the cam holder 47. Each latch consists of a horizontal elongated body 62 having an upstanding finger 63 substantially centrally located between its ends for projection through the slot 54 in the corresponding bar 53. A shoulder 64 formed by reducing the height of the latch at one end is adapted for projection into and engagement with the outer end wall of the slot 54 at times to hold the corresponding cam segment in its outermost position. A spring 65 functions to apply upward pressure to the outer end of the latch 56 so that upon complete projection of the corresponding cam segment the shoulder 64 will be brought into the slot 54 and engaged with the adjacent end wall of said slot.

The device 57 for selectively shifting the cam segments into or out of operative position is mounted upon a circular carrier 66 (Figs. 6, 9, 11) which in turn is supported for rotary movement upon the lower ring 59 of the cam holder 47. Means for shifting the carrier 66 about the central column may consist of an internal ring gear 67, a pinion 68 meshing with it and a vertical shaft 68ª carrying the pinion and connected through bevel gears 68ᵇ to a horizontal shaft 68ᶜ having a hand crank 68ᵈ at its outer end. This shifter (Figs. 6, 8, 9, 10, 12, and 13) consists of a frame 69 which is attached to the upper side of the carrier 66 and formed with four superposed horizontal slideways 70 to accommodate rack bars 71, the latter mounted for sliding movement radially of the machine. These rack bars are arranged in pairs in the upper and lower portions of the frame, the upper bar of each pair carrying at its outer end a depending finger 72 and a downwardly facing cam 73 both of which are at all times disposed outwardly beyond the upstanding fingers 55 on the cam segments. The cam 73 functions during radial inward movement of the rack bar to release a cam segment from the latch 56. Continued inward movement of said rack bar brings the depending finger 72 into engagement with the upstanding finger 55 and secures the rack bar and cam segment together preparatory to inward shifting of the latter. The lower rack bar 71 of each pair operates to shift the cam segments outwardly to an operative position and is adapted to engage the upstanding finger 55 carried by each of said segments. These rack bars are reciprocated by means of magnets and springs to be described presently, operating through sector gears 74 which are pivoted to a pair of vertical hinge pins 75 mounted in guides 76 on the frame 69 and removably held therein by set screws 77.

Oscillation of the sector gears 74 is obtained by means of electromagnets and springs, the magnets operating to move the sector gears in one direction and the springs to effect a reversal of their direction of movement. The upper rack bar 71 (Figs. 8, 9, 10, 12, and 13) is adapted to retract the segments 48 making up the puff cam 44 and is moved radially inward by means of the magnet 78 (Fig. 8). A hinged armature 79 is pivoted to one end of the magnet and connected through a link 80 to an arm 81 on the upper sector gear 74. A coil spring 82 connecting the armature 79 and frame 69 yieldingly holds said armature spaced from the magnet and as a result normally projects the corresponding rack bar to its outermost limit. The sector gear 74 which engages the lower of the upper pair of rack bars is connected by means of an arm 83 and reach rod 84 to a hinged armature 85 which is positioned at one end of a magnet 86. A coil spring 87 operates to so position the sector gear 74 that the lower rack bar 71 of this upper pair is normally positioned as indicated in Fig. 13 in which it is retracted from engagement with the cam segments.

The sector gear 74 which actuates the upper of the lower pair of rack bars is connected by means of an arm 88 and reach rod 89 to a hinged armature 90 at one end of a magnet 91. Here again a spring 92 connected to the reach rod 89 and frame 69 functions to hold the rack bar in its extreme projected position. The lower rack bar 71 which adjusts the blowing cam segments 49 is reciprocated by the lower sector gear 74, the latter connected by means of an arm 93 and reach rod 94 to a hinged armature 95 disposed at one end of a magnet 96. A coil spring 97 yieldingly holds the corresponding rack bar in its innermost fully retracted position.

The magnets referred to above are connected through conductors 98 to a series of vertically spaced circular contact rings 99 (Figs. 6 and 9) which are attached to an upstanding wall 100 on the magnet carrier 66. An insulating ring 101 separates these contact rings 99 from the carrier, said rings being spaced apart vertically and adapted to engage brushes 102 which are mounted in a stationary insulating block 103. These brushes and contact rings of which there are five each, are connected to a control unit 104 (Figs. 6 and 14) arranged at any convenient point relative to the machine and providing semi-automatic selective operation of the magnets in synchronism with adjustment of the cam segment shifter 57 so that the proper magnet will be energized when the cam segment shifter is brought into operative position with respect to one or a pair of cam segments.

This control unit (Fig. 6) consists of four contact rings 105 and four commutator rings 106 grouped in pairs and arranged within an insulating holder 107 enclosed in a housing 108. Each group or pair includes a contact ring 105 and a commutator ring 106 the former being connected by an electric current conductor 109 to one of the contact rings 99 at the upper end of the central column. Each of the commutator rings consists of an annular series of segments corresponding in number to the cam segments and connected through current conductors 110 to push and pull switches 111 which also correspond in number to that of the cam segments. Each switch consists of stationary upper and lower pairs of contacts 112 and 113 respectively, and a movable contact 114 which is attached to the lower end of a rod 115 depending from a finger piece 116. By moving the finger pieces 116 vertically the contact 114 may be moved into or out of engagement with either the upper or lower pair of stationary contacts 112 and 113 respectively. These switches 111 which are arranged in two concentric annular series are connected together by means of conductors 117 disposed between the two series. These conductors 117 in turn are connected by a wire 118 to a master control switch 119 and through the latter to one side 120 of a main line circuit. The other side 121 (Fig. 6) of this main line circuit is connected to one of the brushes 102 at the upper end of the stationary column of the machine.

A rotatable brush carrier 122 is mounted within the ring holder 107 upon a vertical shaft 123 and supports a series of vertically spaced brushes 124 which serve to provide electrical connection between the contact ring and commutator ring of each pair or group. Each brush is of such width that when properly positioned it can engage only one segment of the commutator ring, for obvious reasons. A flexible shaft 125 connects the lower end of the shaft 123 and a worm gear 126 which runs in mesh with a worm 127 on the vertical shaft 68ᵃ. As a result rotation of this shaft 68ᵃ in adjusting the position of the magnet carrier 66 and, therefore, the shifter 57, correspondingly changes the position of the brush carrier 122 and brings the brushes into contact with the commutator segment corresponding to the cam segment which is to be adjusted. A pointer 128 is secured to the upper end of the shaft 123 exterior to the housing 108 in vertical alignment with the brushes 124 and is adapted to point to the finger pieces 116 of the switches 111 through which the electric circuit or circuits will be closed by that particular positioning of the pointer.

A switch 129 in one side or wire 121 of the main line circuit is adapted to be actuated with each one-half revolution of the crank 68ᵈ and at the time such operation of the switch takes place it is intended that the brushes 124 shall be properly positioned in contact with segments of the commutator rings 106 and moreover that the shifter 57 shall be aligned with the cam segment or segments to be adjusted. This switch 129 consists of a housing 130 for a stationary contact 131 and a movable contact 132 the latter carried by a vertical push rod 133 which extends through the upper end of the housing and supports a roller 134. A spring 135 normally and yieldingly holds the movable contact 132 in its uppermost position. Adjacent ends of the wire 121 are suitably connected to the stationary contact 131. A breaker wheel 136 pinned to the shaft 68ᶜ is formed with a pair of diametrically opposed notches 137 in its periphery in one of which the roller 134 is positioned when the switch 129 is closed. At other times such as during rotation of the shaft in the cam selecting operation, the switch 129 is open due to the roller 134 riding upon the high portion of the breaker wheel 136.

In the following description of the operation it will be assumed that the length of the blow cam 46 is to be increased by projection of four additional segments. By reference to suitable markings or indicia on the finger pieces 116, the switches 111 and commutator ring segments 106 corresponding to these four cam segments may be located. The four finger pieces are then pulled upwardly to bring the movable contact 114 into engagement with the upper stationary contacts 112. The crank 68ᵈ is rotated until the shifter unit 57 is brought into register with the first cam segment to be adjusted. At this time one of the recesses 137 in the breaker wheel 136 registers with the roller 134 and results in closing of the switch 129. The master switch 119 is then closed and as a result electric current flows through the several conductors previously described and energizes the magnet 96 which in turn operates through the corresponding hinged armature 95 and reach rod 94 to move one of the sector gears 74 and project the lower of the lower pair of rack bars 71 (Figs. 9 and 13). The crank 68$^d$ is then rotated another 180° thereby advancing the shifter 57 to the next adjacent cam segment and the brushes 124 to the next adjacent commutator segment. Consequently, the same magnet is energized as before and the second segment is projected. This same operation is repeated until the four cam segments have been projected. The master switch 119 is then opened. In the event retraction of these same segments had been desired (considering, of course, that they were in their projected position in the first place) each of the movable contacts 114 would have been projected downwardly to the limit and thereby engaged with the corresponding lower stationary switch contact 113. With this setting the magnet 91 would have been operated and resulted in inward travel of the upper of the lower pair of the rack bars 71. During such inward travel of this rack bar the cam surface 73 imparts downward movement to the latch 56 by engaging the finger 63. This disengages the shoulder 64 on the latch from the adjacent end wall of the slot 54. Continued inward travel of this rack bar brings the depending finger 72 into engagement with the upstanding finger 55 on the cam segment and consequently retracts said segment. Likewise the segments of the puff cam 44 may be projected or retracted. Moreover, it is apparent that any number of these segments may be adjusted, the manner of adjustment being determined primarily by the setting of the movable switch contacts 114 of the control unit 104.

In Figs. 3, 4, and 5, the successive operations controlled by the adjustable cams described herein are illustrated. In Fig. 3 the blow cam 46 is shown engaging the lower roller 45 of the valve operating lever 35 which results in application of air under pressure for the purpose of effecting intimate contact between the glass and metal mold and consequent extraction of heat from the glass. In Fig. 4 the blank "B" is shown suspended from the neck mold 19 and the puff cam operating through the lever 35 has caused a momentary opening of the valve 29. As a result, a short puff of air under pressure is directed into the neck end of the blank and the latter is thereby slightly expanded. This also forms what is known as an "initial blowing opening" facilitating introduction of air under pressure at a later stage of the cycle of operations for the purpose of expanding the blank to its final shape. In Fig. 5 the blow control cam 46 has again operated to cause flow of air under pressure to the chamber 27, this time for the purpose of effecting final expansion of the blank.

Modifications may be resorted to within the spirit and scope of the appended claims.

What I claim is:

1. The combination of a rotating support, a non-rotating support, a group of cams carried by one of said supports and arranged to provide an extended cam surface, cam actuated devices carried by the other of said supports, means for adjusting the individual cams radially of the non-rotating support and thereby varying the effective length of the cam surface, said adjusting means including a cam shifting unit common to all of the cams, means for bringing said unit into operative position relative to the cam to be adjusted, and means for actuating said shifting unit whereby it adjusts said cam.

2. The combination of a rotating support, a non-rotating support, a group of cams carried by one of said supports and arranged to provide an extended cam surface, cam actuated devices carried by the other of said supports, means for adjusting the individual cams radially of the non-rotating support and thereby varying the effective length of the cam surface, said adjusting means including a shifting unit common to all of the cams, means for bringing said unit into operative position relative to the cam to be adjusted, and means operating in synchronism with adjustment of said unit for actuating the latter and causing adjustment of said cam.

3. The combination of an arcuate support, a plurality of cams slidably mounted thereon for individual movement radially of the support into operative and inoperative positions, said cams arranged side by side to form an extended cam surface when the cams are in operative position, a cam shifting unit mounted for movement relative to said support into operative position with respect to the cams one at a time, mechanism for adjusting the position of said unit, and automatic means for actuating the shifting unit.

4. The combination of an arcuate support, a plurality of cams slidably mounted thereon for individual movement radially of the support into operative and inoperative positions, said cams arranged side by side to form an extended cam surface when the cams are in operative position, a cam shifter unit, means for bringing said unit into operative relation to one of the cams to be shifted, means for effecting operative engagement between the shifter unit and cam, and means for actuating said unit whereby it moves the cam selected.

5. The combination of an arcuate support, a plurality of cams slidably mounted thereon for individual movement radially of the support into operative and inoperative positions, said cams arranged side by side to form an extended cam surface when the cams are in operative position, a cam shifter unit, manually controlled means for bringing the shifter unit into operative relation to one of the cams, and means at least in part regulated by operation of the manually controlled means for actuating the shifter and causing it to move the cam selected.

6. The combination of an arcuate support, a plurality of cams slidably mounted thereon for individual movement radially of the support into operative and inoperative positions, said cams arranged side by side to form an extended cam surface when the cams are in operative position, a cam shifter unit, manually controlled means for bringing the shifter unit into operative relation to one of the cams, and electrically controlled devices for actuating the shifter unit and causing it to move the cam selected.

7. The combination of an arcuate support, a plurality of cams slidably mounted thereon for individual movement radially of the support into operative and inoperative positions, said cams arranged side by side to form an extended cam surface when the cams are in operative position, a mechanical cam shifter unit common to said cams, rack bars constituting a part of said unit, means for effecting operative engagement between the rack bars and cams, and means for selectively actuating the rack bars whereby the cams may be individually adjusted.

8. The combination of an arcuate support, a plurality of cams slidably mounted thereon for individual movement radially of the support into operative and inoperative positions, said cams arranged side by side to form an extended cam surface when the cams are in operative position, a cam shifter unit, rack bars constituting a part of said unit, means for effecting operative engagement between the rack bars and cams, means for selectively actuating the rack bars whereby the cams may be individually adjusted, and means for effecting relative movement between the cams and shifter unit whereby the latter may be brought into operative relation to any selected cam.

9. The combination of an arcuate support, a plurality of cams slidably mounted thereon for individual movement radially of the support into operative and inoperative positions, said cams arranged side by side to form an extended cam surface when the cams are in operative position, a cam shifting unit mounted for movement relative to said support into operative position with respect to the cams one at a time, mechanism for adjusting the position of said unit, said unit including rack bars brought into register with the cams one at a time by adjusting the position of said unit, means whereby movement of the rack bars imparts corresponding movement to the cams, and electrically operated devices for actuating said rack bars.

10. The combination of a support, a plurality of cams slidably mounted thereon for individual movement into operative and inoperative positions, said cams arranged side by side to form an extended cam surface when the cams are in operative position, a cam shifting unit mounted for movement relative to said support into operative position with respect to the cams one at a time, mechanism for adjusting the operative position of said unit, said unit including a plurality of vertically spaced horizontal rack bars adapted for operative engagement with the cams one at a time, mechanism including electromagnets for moving the rack bars, and a control device at least in part actuated by the mechanism which adjusts the position of said unit whereby to selectively energize the electromagnets.

11. In combination, a stationary central column, a rotary mold carriage thereon, a plurality of cams slidably mounted upon the stationary column for individual movement into operative and inoperative positions, mechanisms on the mold carriage actuated by said cams, said cams arranged side by side to form an extended cam surface when the cams are in operative position, a cam shifting unit mounted for movement about the axis of said column, adjusting means for moving said unit and bringing it into operative relation to a cam to be adjusted, and means for then actuating said unit and causing it to adjust the selected cam.

12. The combination of a support, a plurality of cams slidably mounted thereon for individual movement into operative and inoperative positions, said cams arranged side by side to form an extended cam surface when the cams are in operative position, a cam shifter unit, manually controlled means for bringing the shifter unit into operative relation to one of the cams, electrically controlled devices for actuating the shifter unit and causing it to move the cam selected, said devices including magnets, hinged armatures thereon, links and levers connecting the armatures and said unit, and means for selectively energizing the magnets.

13. The combination of a support, a plurality of cams slidably mounted thereon for individual movement into operative and inoperative positions, said cams arranged side by side to form an extended cam surface when the cams are in operative position, a cam shifter unit, manually controlled means for bringing the shifter unit into operative relation to one of the cams, electrically controlled means for actuating the shifter unit and causing it to move the cam selected, said means including magnets, a source of electric current, a main control switch, and a series of switches individual to the cams.

14. The combination of a support, a plurality of cams slidably mounted thereon for individual movement into operative and inoperative positions, said cams arranged side by side to form an extended cam surface when the cams are in operative position, a cam shifter unit, manually controlled means for bringing the shifter unit into operative relation to one of the cams, electrically controlled devices for actuating the shifter unit and causing it to move the cam selected, said devices including magnets, operating connections between the magnets and shifter unit, and means for selectively energizing said magnets.

15. The combination of a support, a plurality of cams slidably mounted thereon for individual movement into operative and inoperative positions, said cams arranged side by side to form an extended cam surface when the cams are in operative position, a cam shifter unit, manually controlled means for bringing the shifter unit into operative relation to one of the cams, electrically controlled devices for actuating the shifter unit and causing it to move the cam selected, said devices including magnets, operating connections between the solenoids and shifter unit, means for selectively energizing said magnets consisting of a series of two-way switches individual to the cams, a main control switch, and an auxiliary control switch actuated by adjusting the position of said shifter unit and cooperating with said two-way switches in controlling energization of said magnets.

16. The combination of a support, superposed groups of cams slidingly mounted thereon for individual movement into operative and inoperative positions, the cams of each group arranged side by side to form an extended cam surface when the cams are in operative position, a cam shifter unit common to all of the cams and mounted for movement relative to the support into operative position with respect to the cams one at a time, said unit including a series of shifter bars corresponding in number to the groups of cams, means for effecting interlocking engagement between certain of said bars and the cams, manually controlled means for moving the shifter unit relative to said groups of cams into operative position with any desired cam, and electrically controlled devices for selectively actuating the shifter bars and thereby effecting adjustment of the cam selected.

17. The combination of a support, superposed groups of cams slidingly mounted thereon for individual movement into operative and inoperative positions, the cams of each group arranged side by side to form an extended cam surface when the cams are in operative position, a cam shifter unit common to all of the cams and mounted for movement relative to the support into operative position with respect to the cams one at a time, said unit including a series of shifter bars corresponding in number to the groups of cams, means for effecting interlocking engagement between certain of said bars and the cams, manually controlled means for moving the shifter unit relative to said groups of cams, magnets individual to the shifter bars, operative connection between said magnets and bars, and means for selectively energizing the magnets.

18. The combination of a support, superposed groups of cams slidingly mounted thereon for individual movement into operative and inoperative positions, the cams of each group arranged side by side to form an extended cam surface when the cams are in operative position, a cam shifter unit common to all of the cams mounted for movement relative to the support into operative position with respect to the cams one at a time, said unit including a series of shifter bars corresponding in number to the groups of cams, means for effecting interlocking engagement between certain of said bars and the cams, manually controlled means for moving the shifter unit relative to said groups of cams, magnets individual to the shifter bars, operative connection between said magnets and bars, means for selectively energizing the magnets consisting of a source of electric current, a main control switch, a series of two-way switches individual to the cams, and an auxiliary control switch cooperating with said two-way switches in effecting selective energization of the magnets.

19. The combination of a support, superposed groups of cams slidingly mounted thereon for individual movement into operative and inoperative positions, the cams of each group arranged side by side to form an extended cam surface when the cams are in operative position, a cam shifter unit common to all of the cams and mounted for movement relative to the support into operative position with respect to the cams one at a time, said unit including a series of shifter bars corresponding in number to the groups of cams, means for effecting interlocking engagement between certain of said bars and the cams, manually controlled means for moving the shifter unit relative to said groups of cams, magnets individual to the shifter bars, operative connection between said magnets and bars, means for selectively energizing the magnets consisting of a source of electric current, a main control switch, a series of two-way switches individual to the cams, an auxiliary control switch operated by actuation of the mechanism for adjusting the position of said unit and cooperating with the two-way switches in effecting selective energization of the magnets.

20. The combination of a stationary central column, a mold carriage rotatively supported thereon, cam operated mechanisms on said mold carriage, superposed groups of cams slidably mounted upon the central column for movement radially of the column into operative and inoperative positions, the cams of each group arranged side by side to form an extended cam surface when the cams are in operative position, a cam shifter unit common to the cams carried by the central column and adjustable around the axis thereof, means for effecting operative connection between the unit and cams, manually controlled means for adjusting the operating position of the shifter unit, and automatic means for operating said unit to effect movement of the cam or cams selected.

21. The combination of a stationary central column, a mold carriage rotatively supported thereon, cam operated mechanisms on said mold carriage, superposed groups of cams slidably mounted upon the central column for movement radially of the column into operative and inoperative positions, the cams of each group arranged side by side to form an extended cam surface when the cams are in operative position, a cam shifter common to the cams carried by the central column and adjustable around the axis thereof, means for effecting operative connection between the unit and cams, manually controlled means for adjusting the operating position of the shifter unit, and automatic means operated by adjustment of the position of the shifter unit for actuating the latter and thereby effecting movement of the cam or cams selected.

22. The combination of a stationary central column, a mold carriage rotatively supported thereon, cam operated mechanisms on said mold carriage, superposed groups of cams slidably mounted upon the central column for movement radially of the column into operative and inoperative positions, the cams of each group arranged side by side to form an extended cam surface when the cams are in operative position, a cam shifter unit, a rotatable carrier for said unit mounted upon the central column, means for adjusting the carrier about the column, electrically controlled devices for actuating the shifter unit including magnets on said carrier, control means for said magnets including a series of two-way switches individual to the cams, a main control switch, and an auxiliary control switch.

23. The combination of a stationary central column, a mold carriage rotatively supported thereon, cam operated mechanisms on said mold carriage, superposed groups of cams slidably mounted upon the central column for movement radially of the column into operative and inoperative positions, the cams of each group arranged side by side to form an extended cam surface when the cams are in operative position, a cam shifter unit, a rotatable carrier for said unit mounted upon the central column, means for adjusting the carrier about the column, electrically controlled devices for actuating the shifter unit including magnets on said carrier, means for effecting selective energization of the magnets including two annular series of two-way switches corresponding in number to the cams, a pair of contact rings connected to each of the two-way switches and a pair of the magnets, a pair of commutator rings connected to each of the two-way switches and including segments individual to the cams, a rotary brush carrier and brushes thereon arranged within and engaging the contact and commutator rings for cooperation with the two-way switches in effecting energization of the magnets, and a main control switch.

24. The combination of a stationary central column, a mold carriage rotatively supported thereon, cam operated mechanisms on said mold carriage, superposed groups of cams slidably mounted upon the central column for movement radially of the column into operative and inoperative positions, the cams of each group arranged side by side to form an extended cam surface when the cams are in operative position, a cam shifter unit, a rotatable carrier for said unit mounted upon the central column, means for adjusting the carrier about the column, electrically controlled devices for actuating the shifter unit including magnets on said carrier, means for effecting selective energization of the magnets including two annular series of two-way switches corresponding in number to the cams, a pair of contact rings connected to each of the two-way switches and a pair of the magnets, a pair of commutator rings connected to each of the two-way switches and including segments individual to the cams, a rotary brush carrier and brushes thereon arranged within and engaging the contact and commutator rings for cooperation with the two-way switches in effecting energization of the magnets, a main control switch, and an auxiliary control switch actuated by operation of the mechanisms for adjusting the shifter unit and cooperating with said brushes and two-way switches in effecting energization of the magnets.

25. The combination of a support, a plurality of cams slidably mounted thereon for individual movement into operative and inoperative positions, said cams arranged side by side to form an extended cam surface when the cams are in operative position, latches individual to the cams operating to releasably hold them in operative position, and automatic mechanical means common to all of the cams for moving the cams to an inoperative position and in advance of such movement actuating the latches to release the cams.

26. The combination of a support, a plurality of cams slidably mounted thereon for individual movement into operative and inoperative positions, said cams arranged side by side to form an extended cam surface when the cams are in operative position, latches individual to the cams operating to releasably hold them in operative position, a cam shifter unit including shifter bars, means for moving said bars in the direction in which the cams are to be moved and thereby correspondingly moving the cams, and devices carried by the bars for actuating the latches and releasing the cams.

27. The combination of a support, a plurality of cams slidably mounted thereon for individual movement into operative and inoperative positions, said cams arranged side by side to form an extended cam surface when the cams are in operative position, latches individual to the cams operating to hold them in operative position, a cam shifter unit including shifter bars, means for moving said bars in the direction in which the cams are to be moved and thereby correspondingly moving the cams, devices carried by the bars for actuating the latches and releasing the cams, racks forming a part of said bars, sector gears engaging the racks, and automatic means for rocking the sector gears.

28. In combination, a stationary central column, a rotary mold carriage thereon, a plurality of cams mounted upon the stationary column for individual movement into operative and inoperative positions, said cams adapted to be moved in and out of a substantially circumferential cam path, mechanisms on the mold carriage actuated by said cams, a cam shifting unit mounted for movement about the axis of said column, adjusting means for moving said unit and bringing it into operative relation to a cam to be adjusted and means for then actuating said unit and causing it to adjust the selected cam in or out.

29. In combination, a stationary central column, a rotary mold carriage thereon, a plurality of cams mounted upon the stationary column for individual movement into operative and inoperative positions, said cams adapted to be moved in and out of a substantially circumferential cam path, mechanisms on the mold carriage actuated by said cams, a cam shifting unit mounted for movement relative to said support into operative position with respect to the cams one at a time, mechanism for adjusting the position of said unit, said unit including rack bars brought into register with the cams one at a time by adjusting the position of said unit, means whereby movement of the rack bars imparts corresponding movement to the cams, and electrically operated devices for actuating said rack bars.

30. In combination, a stationary central column, a rotary mold carriage thereon, a plurality of cams mounted upon the stationary column for individual movement into operative and inoperative positions, said cams adapted to be moved in and out of a substantially circumferential cam path, mechanisms on the mold carriage actuated by said cams, a cam shifting unit mounted for movement relative to said support into operative position with respect to the cams one at a time, mechanism for adjusting the operative position of said unit, said unit including a plurality of vertically spaced horizontal rack bars adapted for operative engagement with the cams one at a time, mechanism including electro-magnets for moving the rack bars, and a control device at least in part actuated by the mechanism which adjusts the position of said unit whereby to selectively energize the electro-magnets.

31. In combination, a stationary central column, a rotary mold carriage thereon, a plurality of cams mounted upon the stationary column for individual movement into operative and inoperative positions, said cams adapted to be moved in and out of a substantially circumferential cam path, mechanisms on the mold carriage actuated by said cams, latches individual to the cams operating to releasably hold them in operative position, and automatic mechanical means common to all of the cams for moving the cams to an inoperative position and in advance of such movement actuating the latches to release the cams.

RUSSELL G. ALLEN.